US012810138B2

(12) United States Patent
Yang et al.

(10) Patent No.: US 12,810,138 B2
(45) Date of Patent: Nov. 24, 2026

(54) DIMENSIONAL REDUCTION OF CORRELATED VECTORS

(71) Applicant: Microsoft Technology Licensing, LLC, Redmond, WA (US)

(72) Inventors: Zongxiang Yang, Sammamish, WA (US); Shaoyu Zhou, Issaquah, WA (US); Zhisong Wang, Sammamish, WA (US); Jiaqi Zhang, Foster City, CA (US); Jitesh Singla, Bathinda (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1020 days.

(21) Appl. No.: 17/532,135

(22) Filed: Nov. 22, 2021

(65) Prior Publication Data

US 2023/0162018 A1 May 25, 2023

(51) Int. Cl.

*G06N 3/08* (2023.01)
*G06N 3/045* (2023.01)
*G06N 3/09* (2023.01)

(52) U.S. Cl.

CPC ............... *G06N 3/08* (2013.01); *G06N 3/045* (2023.01); *G06N 3/09* (2023.01)

(58) Field of Classification Search

CPC . G06N 3/08; G06N 3/045; G06N 3/09; G06F 18/2135; G06F 18/2411

See application file for complete search history.

(56) References Cited

U.S. PATENT DOCUMENTS

| | | | | |
|---|---|---|---|---|
| 5,734,796 A * | 3/1998 | Pao | G06N 3/084 706/50 |
| 9,218,574 B2 * | 12/2015 | Phillipps | G06N 20/20 |
| 2003/0028541 A1 * | 2/2003 | Bradley | G06F 18/211 |

FOREIGN PATENT DOCUMENTS

| | | | |
|---|---|---|---|
| GB | 2403559 A * | 1/2005 | G06F 17/3069 |

OTHER PUBLICATIONS

Michael L. Raymer, William F. Punch, Erik D. Goodman, Leslie A. Kuhn, and Anil K. Jain, "Dimensionality Reduction Using Genetic Algorithms", IEEE Transactions on Evolutionary Computation, vol. 4, No. 2, Jul. 2000, 8 pages. (Year: 2000).*

Sophocles J. Orfanidis, "SVD, PCA, KLT, CCA, and All That". 332:525 Optimum Signal Processing. 2002-2007. 78 pages (Year: 2007).*

(Continued)

*Primary Examiner* — Omar F Fernandez Rivas
*Assistant Examiner* — Corey M Sackalosky
(74) *Attorney, Agent, or Firm* — Holzer Patel Drennan

(57) ABSTRACT

A pair of initially-correlated vectors can be reduced in size without altering a known correlation between the vectors. The forgoing can be achieved by defining multiple constraints with respect to first and second embeddings that have a known correlation to one another. At least one of the defined constraints preserves the known correlation between the first and second embeddings during a dimensionality reduction transformation. Mapping functions for performing the dimensionality reduction transformation are derived based on the multiple constraints, and data is selected for output to a user based on one or more computations that utilize embeddings transformed by the derived mapping functions.

21 Claims, 5 Drawing Sheets

(56) References Cited

OTHER PUBLICATIONS

Bishan Yang, Wen-tau Yih, , Xiaodong He, Jianfeng Gao, & Li Deng. "Embedding Entities and Relations for Learning and Inference in Knowledge Bases". ICLR 2015. arXiv:1412.6575v4. Aug. 29, 2015. 12 pages. (Year: 2015).*

Liwei Wang, Yin Li, Svetlana Lazebnik; "Learning Deep Structure-Preserving Image-Text Embeddings", arXiv:1511.06078v2, Apr. 14, 2016, 9 pages. (Year: 2016).*

Kaixiang Wang, Ming Yang, Wanqi Yang, YiLong Yin, "Deep Correlation Structure Preserved Label Space Embedding for Multi-label Classification", Proceedings of Machine Learning Research 95:1-16, 2018, 16 pages. (Year: 2018).*

Leland McInnes, John Healy, James Melville. "UMAP: Uniform Manifold Approximation and Projection for Dimension Reduction". arXiv:1802.03426v3. Sep. 21, 2020. 63 pages. (Year: 2020).*

Yejin Lee, Seong Hoon Seo, Hyunji Choi, Hyoung Uk Sul, Soosung Kim, Jae W. Lee, and Tae Jun Ham. 2021. "MERCI: Efficient Embedding Reduction on Commodity Hardware via Sub-query Memoization". (ASPLOS '21), Apr. 19-23, 2021, 12 pages (Year: 2021).*

Yibing Zhan et al., "Comprehensive Distance-Preserving Autoencoders for Cross-Modal Retrieval", Oct. 22-26, 2018, https://dl.acm.org/doi/pdf/10.1145/3240508.3240607, referenced herein as Zhan (Year: 2018).*

EXXACT, "A Deep Dive Into the Transformer Architecture—the Development of Transformer Models", Jul. 13, 2020, https://www.exxactcorp.com/blog/Deep-Learning/a-deep-dive-into-the-transformer-architecture-the-development-of-transformer-models, referenced herein as EXXACT (Year: 2020).*

Francois Chollet, "Building Autoencoders in Keras", May 14, 2016, https://blog.keras.io/building-autoencoders-in-keras.html, referenced herein as Chollet (Year: 2016).*

Yibing Zhan, Jun Yu, Zhou Yu, Rong Zhang, Dacheng Tao, and Qi Tian. 2018. Comprehensive Distance-Preserving Autoencoders for Cross-Modal Retrieval. In Proceedings of the 26th ACM international conference on Multimedia (MM '18). Association for Computing Machinery, New York, NY, USA, 1137-1145. https: (Year: 2018).*

Passalis, Nikolaos & Tefas, Anastasios. (2017). Dimensionality Reduction using Similarity-induced Embeddings. 10.48550/arXiv.1706.05692. (Year: 2017).*

G. R. Hjaltason and H. Samet, "Properties of embedding methods for similarity searching in metric spaces," in IEEE Transactions on Pattern Analysis and Machine Intelligence, vol. 25, No. 5, pp. 530-549, May 2003, doi: 10.1109/TPAMI.2003.1195989. (Year: 2003).*

Martin Grohe. 2020. Word2vec, node2vec, graph2vec, X2vec: Towards a Theory of Vector Embeddings of Structured Data. In Proceedings of the 39th ACM SIGMOD-SIGACT-SIGAI Symposium on Principles of Database Systems (PODS'20). Association for Computing Machinery, New York, NY, USA, 1-16. https://doi.org/1 (Year: 2020).*

Vikas Raunak, Vivek Gupta, and Florian Metze. 2019. Effective Dimensionality Reduction for Word Embeddings. In Proceedings of the 4th Workshop on Representation Learning for NLP (RepL4NLP-2019), pp. 235-243, Florence, Italy. Association for Computational Linguistics. (Year: 2019).*

* cited by examiner

DIMENSIONAL REDUCTION OF CORRELATED VECTORS

BACKGROUND

An embedding is a mapping of discrete, categorical variables to a vector of continuous numbers. In the context of neural networks, embeddings are learned continuous vector representations of discrete, categorical variables that are useful because that can reduce the dimensionality of such variables and meaningfully represent categories in the transformed space. In a supervised neural network, embeddings form the parameters (weights) of the neural network which are adjusted to minimize loss on a given task. The resulting embedded vectors are representations of categories where similar categories are closer to one another in vector space. For example, it is possible to learn an embedding for each of one million users based on internet click history (e.g., indicating interests and intents) for the user, where each embedding has a large number of dimensions (e.g., 100+ dimensions) and where users with similar interests are characterized by spatially similar embeddings.

Although the use of embeddings reduces the dimensionality of the categorical variables they represent, embeddings are typically still quite large. Performing computations using embeddings can be resource intensive.

SUMMARY

Figure 1:
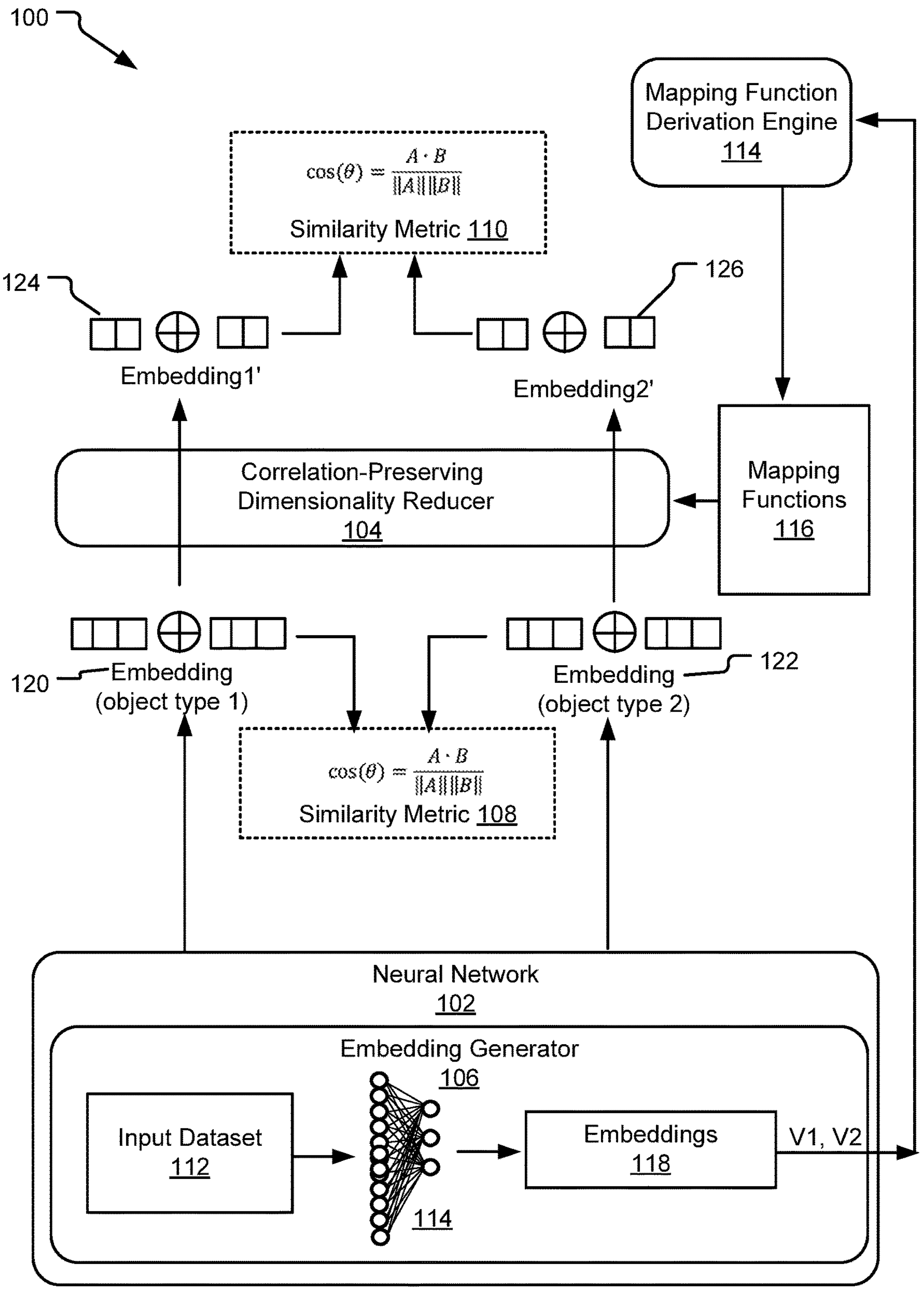
FIG. 1 illustrates an example system for reducing the dimensionality of initially-correlated vectors while also preserving the degree of correlation between the vectors.

A method disclosed herein provides generally for dimensional reduction of correlated vectors. The method includes obtaining first and second embeddings having a known correlation to one another and defining multiple constraints with respect to the first and second embeddings. At least one of the defined constraints preserves the correlation between the first and second embeddings across a transformation that reduces the dimensionality of such embeddings. The method further provides for deriving mapping functions for generating transformed versions of the first embedding and the second embedding based upon the defined constraints. The method further provides for selecting data to output to a user based on one or more computations that utilize the transformed versions of the first embedding and the second embedding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

When a deep learning neural network is used to generate embeddings to represent discrete variables, the resulting embeddings are correlated in vector space such that more similar variables have embeddings that are closer to one another in the vector space than variables that are less similar. Correlation is measured by computing a similarity metric, such as by computing a dot product between two vectors or by computing a cosine similarity between the vectors.

In some neural networks, embeddings may be co-trained for variables corresponding to different types of objects. For example, a same neural network may generate embeddings representing users and embeddings representing content items the users interact with. Since user embeddings and content item embeddings are generated by co-training a same deep learning model with different types of object data, a correlation exists between each user embedding and each content item embedding, where the strength of the correlation is generally proportional to the likelihood of the user being interested in or acting upon (e.g., clicking on) the content item. Other deep learning models may similarly be co-trained on three or more different object types to generate embeddings that can readily be compared to one another, such as by computing a dot product or cosine similarity between pairs of the embeddings.

In some implementations, machine learning models generate embeddings that are very long, such as a few hundred dimensions. It can be computationally expensive to perform basic computations on embeddings of such size. For example, if a dataset includes embeddings for one million users, identifying users with similar interests may entail computing a dot product between thousands of pairs of embeddings in the dataset, where each dot product itself includes hundreds of dimensions. To reduce the complexity and processing resources consumed by such computations, a common technique is to reduce the dimensionality of embeddings via known techniques that aim to mitigate information loss. As is discussed further below, these known techniques do not preserve correlations between initially-correlated vectors and are therefore not suitable for use in systems that rely on such correlations to perform computations.

Although there exist a number of existing methods for reducing the dimensionality of embeddings, one popular tool is principal component analysis (PCA). PCA decreases the dimensionality of embeddings by creating new variables that are orthogonal with one another in a new coordinate system and that successively maximize variance across the dataset. While PCA and other dimensionality reduction techniques work well in many use cases, these techniques are less useful for cases that depend upon the preservation of vector-to-vector correlations. In cases where two or more embeddings are originally correlated (e.g., they exhibit some measurable degree of similarity due to being generated by the same neural network), the correlation can be diminished when the two vectors are individually subjected to existing dimensionality reduction techniques, such as PCA. Consequently, computations subsequently performed using the reduced-dimensionality embeddings are less accurate than the same computations performed on the embeddings prior to the dimensionality reduction.

The dimensionality reduction technique disclosed herein preserves the correlations between embeddings generated by a same neural network while also mitigating information loss in a manner similar to currently-popular dimensionality reduction techniques, such as PCA. Preserving the degree of correlation between initially-correlated embeddings (e.g., generated by a same neural network) facilitates accurate embedding-based computations at a reduced computational cost.

FIG. 1 illustrates an example system 100 for reducing the dimensionality of initially-correlated vectors while also preserving the degree of correlation between the vectors. As is explained below in further detail, these correlated vectors V1, V2 are used to generate a set of mapping functions 116 that are then usable to reduce the dimensionality of other correlated vectors created by a same mechanism or methodology (e.g., a trained machine learning model). By example and without limitation, the correlated vectors V1, V2, of FIG. 1 are shown to be embeddings generated by a neural network 102. In other implementations, the vectors V1 and V2 are not embeddings but rather, otherwise correlated vectors created by a same mechanism or process. The system includes a neural network 102 with an embedding generator 106 that maps discrete objects to vectors—"embeddings"—containing real numbers. The overall patterns of location and distance between embeddings are tailored through the training of the neural network 102.

The neural network 102 is a deep learning network that may assume a variety of different forms in different implementations including that of a graph neural network (GNN), convolutional neural network (CNN), a recurrent neural network (RNN), an artificial neural network (ANN), etc. In one implementation, the neural network 102 is set up with supervised inputs (e.g., an input dataset 112) to train a model to solve a particular a supervised machine learning problem. For example, the neural network 102 may be trained to receive a single word input and output a word that is semantically most similar; alternatively, the neural network 102 may be trained to receive user information identifying watch history or what the user is currently watching and, in response, output a prediction of a movie the user is most likely to watch next, or to complete any other task that can be trained via a supervised learning approach.

The neural network 102 includes at least an embedding generator 106 that receives an input dataset 112 and generates a set of embeddings 118, where each individual embedding in the set corresponds to an object defined in the input dataset 112. For example, the objects may be users, movies, ads, words, etc. Some types of deep learning networks may be co-trained to generate embeddings for multiple different types of objects within a same vector space.

In one implementation, the neural network 102 is a recommender system tasked with making predictions about a user's interests based on the interests of many other users. For example, the system may be trained to recommend movies to users based on a catalog of movie and records of which movies each user has watched in the past. In this example, the embedding generator 106 embeds the movies (e.g., a first type of object type) in a low-dimensional vector space where movies that have been jointly watched by a same user are nearby one other. The embedding generator 106 also creates embeddings for users (e.g., a second object type) in the same space based on the movies those users have watched. In the resulting space, each user embedding is close to the movie embeddings corresponding to the movies that the user has watched. Since nearby users and movies share preferences, this method allows for recommendations to be generated based on the proximity between the embeddings of the different object types.

In the above example, the set of embeddings 118 includes embeddings of different object types (e.g., users and movies) that are correlated in the sense that the embeddings can be compared to one another to measure a similarity between the objects of the different types. This correlation can be readily measured by computing a similarity metric, such as a dot product between two embeddings or a cosine similarity between two embeddings. In these examples, the magnitude of the similarity metric 108 is indicative of the strength of correlation (similarity) between the two embeddings.

By example and without limitation, FIG. 1 illustrates an example similarity metric 108 that may be computed to determine a similarity between a first embedding 120 of a first object type and a second embedding 122 of a second object type. For example, the first object type may be "users" and the second object type may be "movies." A strength of correlation (similarity) between a user embedding and a movie embedding is proportional to a probability of the corresponding user having a positive interaction with (e.g., enjoying) the movie.

In some implementations, the embeddings 120, 122 are long numerical vectors including many (e.g., hundreds) of dimensions. In such cases, computing the similarity metric 108 can consume significant overhead, particularly in cases where the similarity metric 108 is computed many times over, such as with respect to thousands of user embeddings and thousands of content items (e.g., movies, ads, etc.). Some systems that utilize embeddings implement dimensional reduction techniques, such as PCA. However, these techniques do not preserve the degree of correlation between embeddings. For example, the embeddings 120, 122 may initially have a cosine similarity of 0.9, representing a high degree of similarity. When the embeddings are individually subjected to existing dimensionality reduction techniques, this correlation is not preserved and may be higher or lower than 0.9. Consequently, the similarity metric 108 will yield a different (less accurate) value once the embeddings 120, 122 are individually subjected to an existing dimensionality reduction technique. For this reason, existing dimensionality reduction techniques cannot be reliably used in systems that make predictions based on correlations between embeddings.

To address the foregoing, the system 100 includes correlation-preserving dimensionality reducer 104 that accesses pre-computed and stored mapping functions 116 when transforming the embeddings 120, 122 to corresponding reduced-dimensionality embeddings 124, 126. The mapping functions 116 are derived by a mapping function derivation engine 114 that imposes constraints effective to ensure that a defined correlation between the original embeddings 120, 122 is maintained (e.g., substantially the same or satisfying a defined threshold) across the transformation.

In one implementation, the mapping function derivation engine 114 derives a mapping function for each different object type represented within the neural network 102. For example, the derivation of the mapping functions 116 may occur during initial training of the neural network 102 and/or at one or more additional times after the training is complete (e.g., to update the stored functions based on newly-received object data).

The mapping function derivation engine 114 co-derives at least a first mapping function X with respect to embeddings corresponding to a first object type (e.g., users) and a second mapping function Y with respect to embeddings corresponding to a second object type (e.g., content items). The mapping functions X,Y are derived based upon a set of constraints collectively ensuring that a known initial correlation between embeddings corresponding to different object types is preserved during the dimensional reduction of those embeddings.

If, for example, V1 and V2 represent initial embeddings corresponding to object type 1 and object type 2, respectively, the mapping function derivation engine 114 derives mapping functions X and Y to arrive at corresponding reduced-dimension embeddings V1' and V2', where V1'=V1(X) and V2'=V2(Y), where the computed similarity metric 108 between V1 and V2 is substantially the same as the computed similarity metric 110 between V1' and V2'. In different implementations, the mapping function derivation engine 114 may associate different weight terms with each constraint equation when deriving the mapping functions X, Y from the constraint equations. For examples, the weight terms may be selectively varied to ensure tighter or looser preservation of vector-to-vector correlations and/or other relationships for which preservation is desired based upon the design goals and purpose served by the given model.

When the neural network 102 performs a computation that compares embeddings of different object types, the correlation-preserving dimensionality reducer 104 retrieves the stored mapping functions (e.g., X, Y) associated with each different embedding type and generates the reduced-dimensionality embeddings (e.g., 124, 126) for each different embedding that is to be compared. Comparative computations, such as the similarity metric 110, are then computed based on the reduced-dimensionality embeddings (e.g., 124, 126) rather than the lengthy and computationally expensive corresponding original embeddings (e.g., 120, 122). The neural network 102 selects data to output (e.g., the solution to the trained task) based on these computations utilizing the reduced-dimensionality embeddings. This technique significantly reduces processing and power resources consumed by the neural network as compared to systems that perform comparative computations using lengthy original embeddings.

Figure 2:
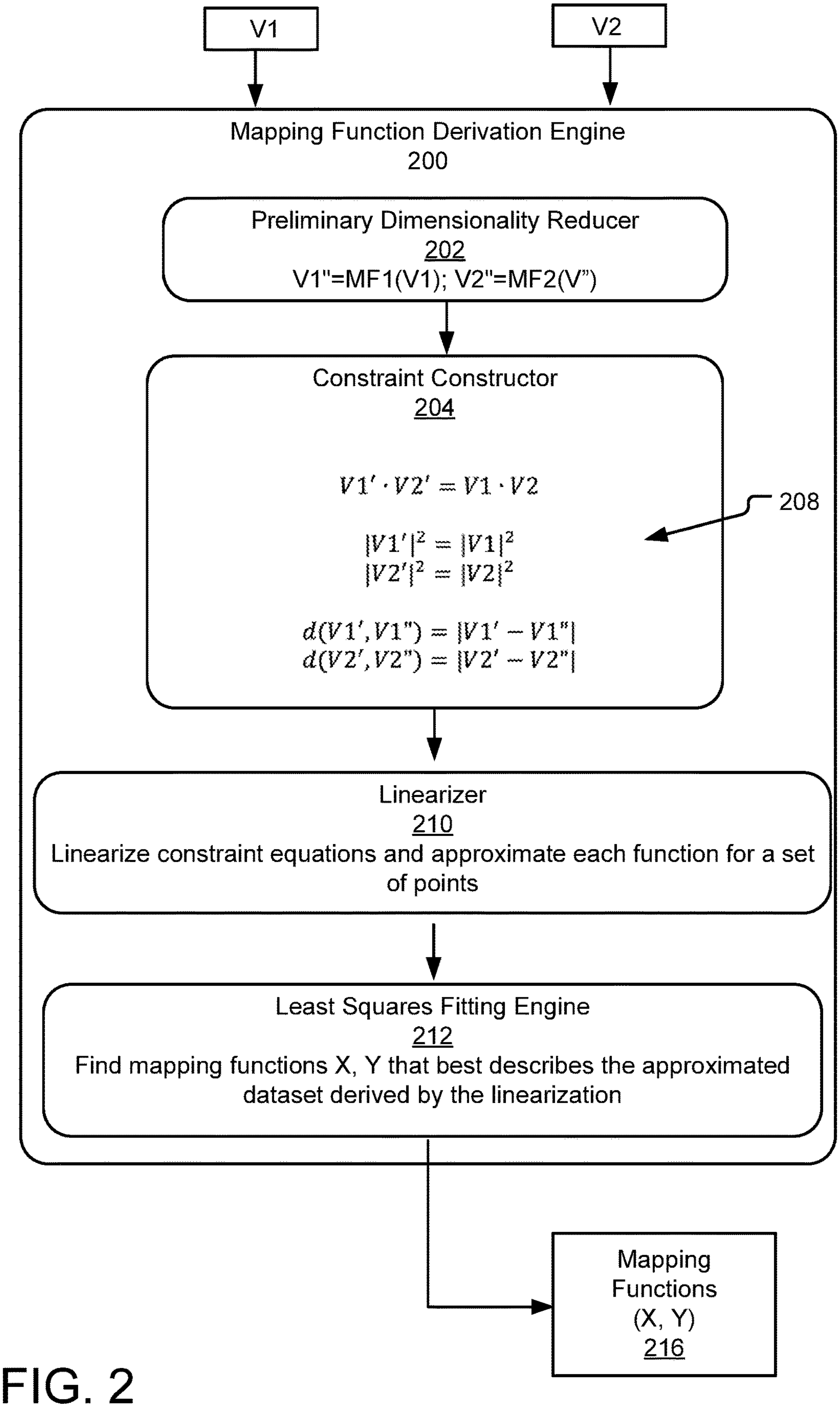
FIG. 2 illustrates a mapping function derivation engine configured to derive correlation-preserving mapping functions usable to reduce the dimensionality of correlated vectors without substantially altering a degree of correlation between such vectors.

FIG. 2 illustrates a mapping function derivation engine 200 configured to derive correlation-preserving mapping functions usable to reduce the dimensionality of correlated vectors without substantially altering a degree of correlation between such vectors. According to one implementation, the mapping function derivation engine 200 receives vectors samples over many months or days and uses those samples to derive mapping functions 216. In FIG. 1, the mapping function derivation engine 200 is shown receiving a pair of vectors V1, V2 and the derivation process below is described with respect to this single pair of vectors. However, it should be understood that the process generally described with respect to FIG. 2 may be repeated with multiple pairs of correlated vectors to refine the mapping functions 216 for best fit to a dataset.

As input, the mapping function derivation engine 200 receives a pair of vectors V1 and V2. In one implementation, the vectors V1, V2 are generated by a same deep learning model and correspond to different types of objects co-trained as embeddings with the same deep learning model. For example, the embedding V1 may correspond to a user while the embedding V2 corresponds to a digital content item that the user may interact with, such as an advertisement.

The end objective of the mapping function derivation engine 200 is to identify mapping functions 116 (X, Y) that are usable to reduce the dimensionality of V1, V2 while preserving a correlation between V1 and V2 as well as other designated vector relationship(s). Thus, the goal is to identify an X and Y such that V1'=V1(X) and V2'=V2(Y), where X and Y satisfy a set of constraints designed ensure preservation of the known correlation between V1, V2 as well as to preserve other relationships and/or information, as discussed further below.

Upon receipt at the mapping function derivation engine 200, the embeddings V1, V2 are input to a preliminary dimensionality reducer 202, which applies an alternative (known) technique for reducing the dimensionality of the embeddings individually. In one implementation, the preliminary dimensionality reducer 202 implements a classical technique, such as principal component analysis (PCA) or linear discriminant analysis (LDA). In other implementations, the preliminary dimensionality reducer 202 implements other technique(s) for dimensionality reduction. For example, a technique for intensity correlation constraint (ICC) may be applied.

The preliminary dimensionality reducer 202 transforms each of the input embeddings V1, V2 to a corresponding preliminary-reduced-dimensionality embedding V1" and V2."

In one implementation, the preliminary dimensionality reducer 202 applies principal component analysis (PCA). PCA reduces the dimensionality of each vector V1, V2 while retaining the variation present in each original vector V1, V2 up to the maximum extent. This is achieved by transforming the variables within each vector to a new set of variables known as the principal components (or simply, the PCs—eigenvectors of a covariance matrix), which are orthogonal and that have maximum variance relative to one another. In another implementation, the preliminary dimensionality reducer 202 applies linear discriminant analysis (LDA), which uses statistics to find linear combinations of features that characterize or separate two or more classes in a way that achieves maximum separation between classes and minimum separation within each class. In still other implementations, the preliminary dimensionality reducer 202 applies other classical or non-classical dimensional reduction techniques.

Regardless of the techniques applied by the preliminary dimensionality reducer 202, the computation by the preliminary dimensionality reducer 202 results in a pair of reduced dimensionality vectors V1", V2" that are associated with the original vectors V1, V2 by way mapping functions MF1, MF2, where MF1 and MF2 are linear transformation matrices of size (N, M+1) where N is the size of the reduced dimension vector, which is smaller than the original size (R) of V1 and V2. Although MF1 and MF2 may be not known initially, these functions can be readily solved for since V1"=MF1(V1) and V2"=MF2(V2). In one implementation, the mapping functions MF1, MF2 are subsequently used as initial values for the mapping functions 216 (X,Y) derived via the operations discussed below. In other implementations, the mapping functions 116 are initialized using identity matrices.

The original vectors V1, V2 and the preliminary-reduced-dimensionality vectors V1", V2" are input to a constraint constructor 204, which constructs a number of constraints 208 representing desired relationships to preserve when mapping V1 and V2 to corresponding reduced-dimensionality vectors V1', V2.'

Although the constraints 208 imposed may vary from one implementation to another, at least one of the constraints 208 is a correlation constraint requiring that a computed similarity metric between V1, V2 satisfy a threshold similarity with a computed similarity metric between the final reduced dimensionality vectors V1', V2'. For example, the correlation constraint may be an expression of the form of equation 1 below:

$$V1' \cdot V2' = (V1 \cdot V2) \quad (1)$$
$$\text{weight} = W1$$

where W1 is a selected weight, subsequently used by a linearizer 210, defining the strength of correlation that is to be preserved. Here, a weight of '1' would enforce preservation of the correlation to be the same or substantially the same before and after the dimensionality reduction; however, other weights may be suitable in some implementations.

Although the number of constraints defined by the constraint constructor 204 may vary from one implementation to another, it may be easier to arrive at a stable, converging solution to the mapping functions X, Y when at least two or more separate constraints are defined and used in the derivation of X, Y. One optional constraint that may help to obtain a converging solution is to define magnitude constraints that ensure the magnitude of each reduced dimension vector V1', V2 is similar to that of the original vectors V1, V2. For example, magnitude constraints may assume the form of equations (2) and (3) below:

$$|V1'|^2 = |V1|^2 \quad (2)$$
$$\text{weight} = W2$$

$$|V2'|^2 = |V2|^2 \quad (3)$$
$$\text{weight} = W3$$

where W2 and W3 are selected weights, subsequently used by the linearizer 210, defining the degree by which the intensity is preserved between the original vector and corresponding reduced dimension vector.

Still other implementations may additional or alternatively define one or more constraints that are intended to mitigate information loss between the preliminary approach (e.g., the MF1, MF2 functions applied by the preliminary dimensionality reducer 202) and the modified approach applied via the mapping functions 216. By restricting a vector distance between the final modified vectors V1', V2' and the versions of these vectors derived using the preliminary dimension reduction approach V1", V2", properties maintained using the preliminary approach(es) may be also maintained in the herein proposed modified approach. For example, distance constraints may assume the form of equations (4) and (5) below:

$$d(V1', V1'') = (|V1' - V1''|) = 0 \quad (4)$$
$$\text{weight} = W4$$
$$d(V2', V2'') = (|V2' - V2''|) = 0 \quad (5)$$

-continued $$\text{weight} = W5$$

where W4 and W5 are selected weights, subsequently used by the linearizer 210, defining the degree by which the distance is preserved between the preliminary dimensionality reduction result and the reduced dimensionality vectors that are to be generated by the mapping functions X,Y. If, for example, the preliminary dimension reduction approach applies PCA, which maximizes variance within each vector, the above-defined distance constraints ensure that the maximum variance property is maintained to some predefined extent in the final reduced dimension vectors V1' and V2' relative to corresponding vectors V1" and V2" that are derived by the preliminary dimensionality reducer 202.

Equations 4 and 5 above generally function to preserve the same type of information in the final vectors V1', V2' as would be preserved in the corresponding preliminary-reduced-vector V1" or V2", regardless of the nature of such information. Thus, these distance constraints may be beneficial in implementations where alternative dimensionality reduction techniques are employed instead of PCA (e.g., such as LDA and other techniques).

Notably, the constraint equations 1-5 above can be re-written in terms of the mapping functions X, Y, which represent the unknowns to be solved for. That is, equations 1-5 can be written in the form of equations 6-10 below:

$$F_1(X, Y) = \|V_1'\| = \|V_1\| = \sum_{i=1}^{R} v1_i^2 = B1 \quad (6)$$
$$F_2(X, Y) = \|V_2'\| = \|V_2\| = \sum_{i=1}^{R} v2_i^2 = B_2 \quad (7)$$
$$F_3(X, Y) = V_1' \cdot V_2' = V_1 \cdot V_2 = \sum_{i=1}^{R} v1_i \cdot v2_i = B_3 \quad (8)$$
$$F_4(X, Y) = \|V_1' - V_2'\| = \sum_{i=1}^{N} (v1_1' - v1_1'')^2 = 0 = B_4 \quad (9)$$
$$F_5(X, Y) = \|V_2' - V_2''\| = \sum_{i=1}^{N} (v2_1' - v2_1'')^2 = 0 = B_5 \quad (10)$$

where R is the original dimension of each of V1, V2 and N is the final dimension of V1' and V2.' After the constraints 208 are constructed, a linearizer 210 applies partial derivatives to the non-linear constraint equations (e.g., equations 6-10 above) to find linear approximations to each function at a set of points. The linear approximation of each of the constraint equations (6-10) is given generally by re-writing the equation according to the form:

$$F(X, Y) = F_0(X, Y) + \frac{\partial F(X, Y)}{\partial X}\Delta X + \frac{\partial F(X, Y)}{\partial Y}\Delta Y - B_i = 0 \quad (11)$$

which can be further re-written in the form A·X=B, where:

$$A = \left[\frac{\partial F(X, Y)}{\partial X} \; \frac{\partial F(X, Y)}{\partial Y}\right]$$
$$X = \begin{pmatrix} \frac{\partial F(X, Y)}{\partial X} \\ \frac{\partial F(X, Y)}{\partial Y} \end{pmatrix}$$

-continued $$B = \begin{bmatrix} B_1 - F_1(X_0, Y_0) \\ B_2 - F_2(X_0, Y_0) \\ B_3 - F_3(X_0, Y_0) \\ B_4 - F_4(X_0, Y_0) \\ B_5 - F_5(X_0, Y_0) \end{bmatrix}$$

Here, matrix A is obtained by taking the partial derivatives of the function F with respect to unknowns X and Y. The initial values of each function ($X_0$, $Y_0$) may be set to equal MF1 and MF2, which may be derived following the preliminary dimensional reduction described above with respect to the preliminary dimensionality reducer 202.

By applying linearization to approximate the constraint equations (eq. 6-10) at a series of points (e.g., indices within each of the vector V1, V2), a dataset is derived. A least squares fitting engine 212 uses a least squares approach to solve for X and Y by minimizing the sum of the squares of the residuals made in the results of every single equation at each of the approximated points.

The above approach essentially provides for setting initial values of the mapping functions X, Y to the corresponding preliminary mapping functions MF1 and MF2 or with prespecified values, and then by iteratively modifying X and Y by applying the least squares optimization at each of the data points approximated by the equations. This adjustment continues at each approximated point (e.g., corresponding to an index in V1, V2) until convergence is reached or until the solution satisfies a predefined threshold with respect to one or more (e.g., all) of the predefined constraints.

The above-described operations result in mapping functions X, Y, which are usable to uniformly reduce the dimension of V1, V2 to a preselected number of dimensions while still preserving (1) the known initial correlation between V1 and V2 as well as (2) the magnitude of each of the original vectors V1 and V2; and (3) the variance and/or other types of information preserved when applying the preliminary dimensionality reduction.

In some implementations, the mapping function derivation engine 200 derives multiple different versions of the mapping functions X and Y, each version being tailored to provide a reduced dimensionality vector (V1', V2') of a selected size. For example, the mapping functions 116 that are derived and stored may include a first set of mapping functions $X_1$, $Y_1$ that are usable to convert V1, V2 to 2-dimensional vectors; a second set of mapping functions $X_2$, $Y_2$ that are usable to convert V1, V2 to 4-dimensional vectors; a second set of mapping functions $X_3$, $Y_3$ that are usable to convert V1, V2 to 8-dimensional vectors, etc. In this example, the three generated sets of mapping functions $X_1$, $Y_1$, $X_2$, $Y_2$, $X_3$, $Y_3$ are saved for subsequent computations performed on either the vectors V1, V2, or on updated versions of such vectors (e.g., if new object information is received in the interim), or on other vectors (embeddings) of the same variable types co-trained on the same deep learning model.

Figure 3:
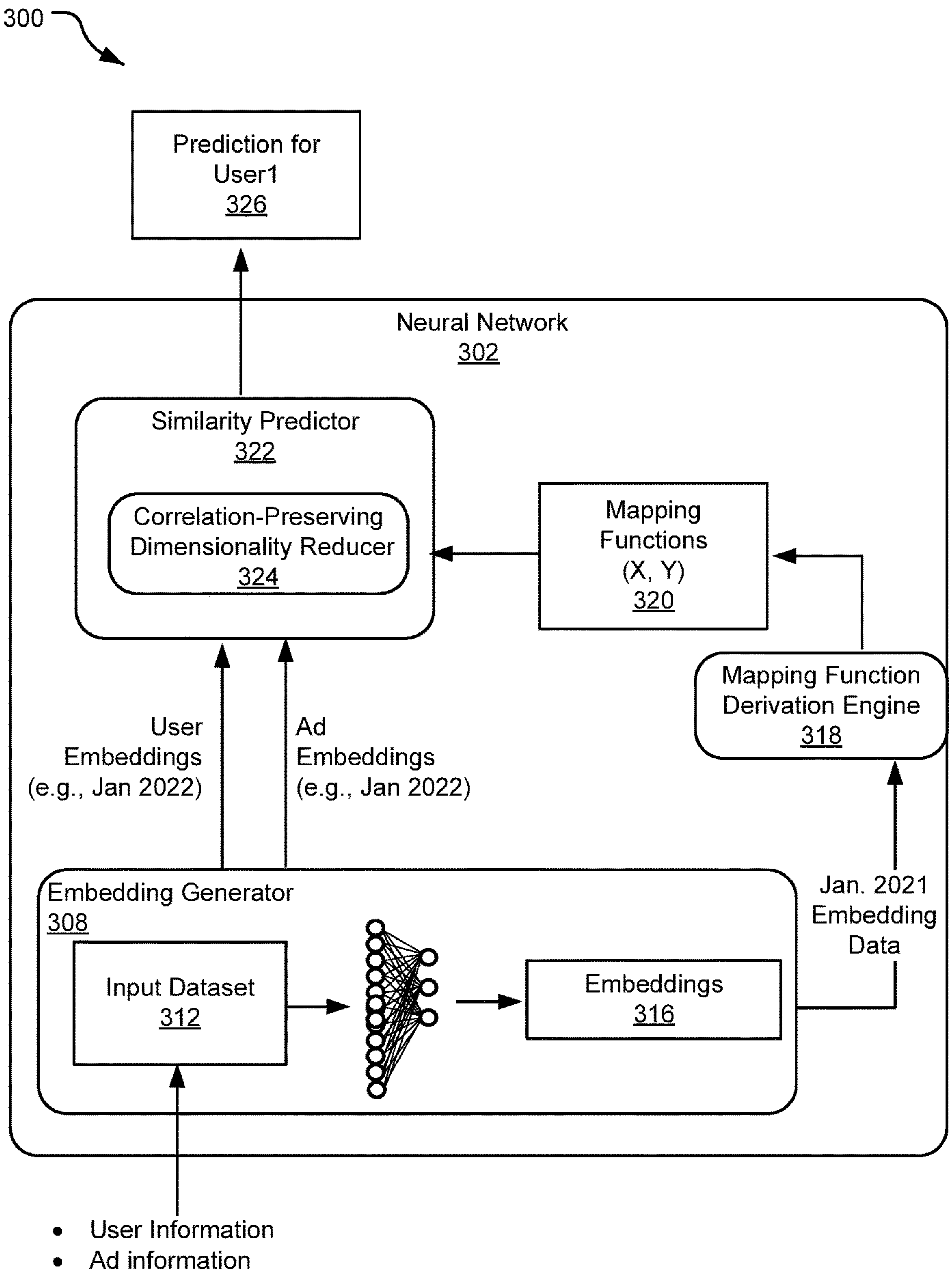
FIG. 3 illustrates an example system that generates, stores, and uses mapping functions for dimensional reduction of correlated vectors.

FIG. 3 illustrates an example system 300 that generates, stores, and uses mapping functions for dimensional reduction of correlated vectors without substantially altering a known correlation between the vectors. The system 300 includes a neural network 302 that has been trained, via a supervised learning process, to perform a task. By example and without limitation, the neural network 302 of FIG. 3 has been trained to predict ads that individual users are likely to click on or interact with. For example, given a selected user, the neural network 302 is able to select a singular ad from a large database (e.g., one million ads) where the selected ad is identified as being the most relevant ad to the individual user.

In the example of FIG. 3, the neural network 302 has been trained with an input dataset 312 that includes objects associated with each of two different types of variables—users and advertisements. For example, the input dataset 312 may include a user object for each of a half million users and an ad object for each of one million ads in a database. The neural network 302 includes an embedding generator 308 that creates an embedding corresponding to each user object (user embedding) and each ad object (ad embedding). Each user object used to create a corresponding user embedding includes user information, such as information compiled based on the user's past interactions with a given platform (e.g., click history, purchases, etc.). For example, the information may generally characterize the user's intents and interests (e.g., the user is planning a trip to Italy or has an interest in a certain genre of books). In contrast, each ad object used to create a corresponding ad embedding includes ad information descriptive of the advertisement such as the type of ad (e.g., auto ad, smartphone ad), title, description, destination URL, keywords, etc.

In one implementation, the neural network 302 is a graph neural network (GNN) that initializes user objects and advertisement objects as graph nodes connected by edges representing a determined similarity between the corresponding nodes. For example, embedding generator 308 performs feature extraction and aggregation on the user objects to generate embeddings specific to users and then separately performs feature extraction and aggregation on the advertisement objects to generate embeddings specific to advertisements. Following this, the embedding generator 308 performs joint feature extraction and aggregation on the embeddings that have been created for both users and ads, yielding a third set of embeddings representative of each user and each ad in the same vector space. In this third set of embeddings, a measurable correlation exists between each user embedding and each ad embedding, where the strength of the correlation between the embeddings generally represents the similarity between the two (e.g., the likelihood that the user is to interact with or react positively to the advertisement). This third set of embeddings is corresponds to "embeddings 316" in FIG. 3, which are used by the neural network 302 to make predictions.

A set of the embeddings 316 generated at a first time (e.g., January 2021) are provided to a mapping function derivation engine 318, which uses the embeddings to derive a set of mapping functions 320 usable to reduce the size of each embedding in the set of embeddings 316 while preserving correlations between the embeddings. The set of mapping functions 320 may be stored and used to reduce the dimensionality of versions of the embeddings 316 that are created in the future (e.g., modified after January 2021). For example, the mapping functions 320 may be generated based on a set of embeddings 316 generated in January 2021, stored, and subsequently used to reduce the dimensionality of the embeddings in January 2022, after those embeddings have been updated several times. Operations performed by the mapping function derivation engine 318 may be the same or similar to those described above with respect to FIG. 2.

Given a neural network trained with two types of objects—e.g., user objects and ad objects—the mapping function derivation engine 318 co-derives at least a pair of mapping functions (X,Y), where the first mapping function of the pair (e.g., X) is usable to transform the embeddings corresponding to the first object type and where the second mapping function of the pair (e.g., Y) is usable to transform the embeddings of the second object type. Some implementations of the mapping function derivation engine 318 may derive multiple pairs of mapping functions (e.g., [$X_1$, $Y_1$], [$X_2$, $Y_2$], [$X_3$, $Y_3$]), where each pair provides a dimensionality reduction of different magnitude on a pair of correlated vectors corresponding to the first and second different object types. For example, [$X_1$, $Y_1$] may be applied to transform each of a user embedding and an ad embedding from 128 dimensions to 2 dimensions, while [$X_2$, $Y_2$] may be applied to transform the user embedding and the ad embedding from 128 dimensions to 4 dimensions.

Each co-derived stored pair (X, Y) of mapping functions 320 is usable to reduce the dimensionality of any pair of embeddings co-trained on the neural network, where the embeddings of the pair correspond to different object types. The resulting transformed embeddings have an equal number of dimensions and are correlated with one another by a predefined degree relative to the correlation existing within the corresponding the original (non-transformed) embeddings. In one implementation, the correlation between the transformed embeddings is the same or substantially the same as the correlation between the original (non-transformed) embeddings.

A similarity predictor 322 performs the task of predicting which ad in the advertisement database is most likely to appeal to a selected user (e.g., User 1). This operation is performed by measuring a similarity metric between an embedding for the user (e.g., V1) and an embedding for each ad in the database (e.g., V2, V3, V4 . . . ) For example, the similarity metric for a user and a single ad may be computed by taking the dot product between the embedding for the user and the embedding for the ad. Notably, the embeddings utilized in this computation may be different from those corresponding embeddings generated from the input dataset 312. For example, the embeddings for users may be periodically updated based on new user information (e.g., new digital content items that the user has interacted with). These updated embeddings may be transformed using mapping functions 320 that are derived and stored at an earlier time, such as during training of the neural network.

To reduce the computational complexity of computing a similarity metric for a pair of the embeddings 315, the similarity predictor 322 includes a correlation-preserving dimensionality reducer 324. The correlation-preserving dimensionality reducer selects a pair [X,Y] of the mapping functions 320 that have been previously co-derived and stored by the mapping function derivation engine 318. The similarity predictor 322 uses the selected mapping function pair to reduce the dimensionality of select user/ad embedding pairs.

For each of multiple user/ad embedding pairs, the correlation-preserving dimensionality reducer 324 generates a transformed pair of correlated embeddings of reduced dimensionality, and the similarity predictor 322 computes the similarity metric for the pair. For example, reduced dimension embeddings may be dynamically generated for a user (user_1) and each of 5000 advertisements. The similarity predictor 322 may take the dot product between the reduced dimension user embedding and each one of the reduced dimension ad embeddings to identify which ad embedding has a greatest similarity to the user embedding. The similarity predictor 322 identifies and selects the ad embedding that is most similar to the user embedding and outputs information about the corresponding ad in the form of a prediction 326. For example, the prediction may indicate that the user is most likely to click on the selected ad. In another implementation, the selected ad is automatically provided as an input to a system that presents advertisements to the user.

In some implementations, the correlation-preserving dimensionality reducer 324 interfaces with a graphical user interface that includes a setting allowing a system administrator to select the size of reduced dimensionality embeddings that are to be created and used in the computations performed by the similarity predictor. Depending on processing and power resource availability, the system administrator may toggle the setting to provide for smaller (e.g., 2 dimension) or larger (e.g., 6 dimension) embeddings in this set of computations. The correlation-preserving dimensionality reducer 324 retrieves a select pair of the mapping functions 320 that is associated with the selected dimension setting.

The above example provided with respect to FIG. 3 is intended to show one of multiple example system environments in which it may be useful to utilize the correlation-preserving dimensionality reduction techniques disclosed herein. Although the system 300 co-trains embeddings for two object types (users, ads) other systems may similarly train embeddings for three or more different object types. In these systems, the mapping function derivation engine 318 may co-derive larger sets of dimensionality-reducing mapping functions using methodology the same or similar to that described above to preserve correlations between the embeddings of different types (e.g., co-deriving a trio of mapping functions X, Y, Z to facilitate dimensional reduction on three different object types).

Figure 4:
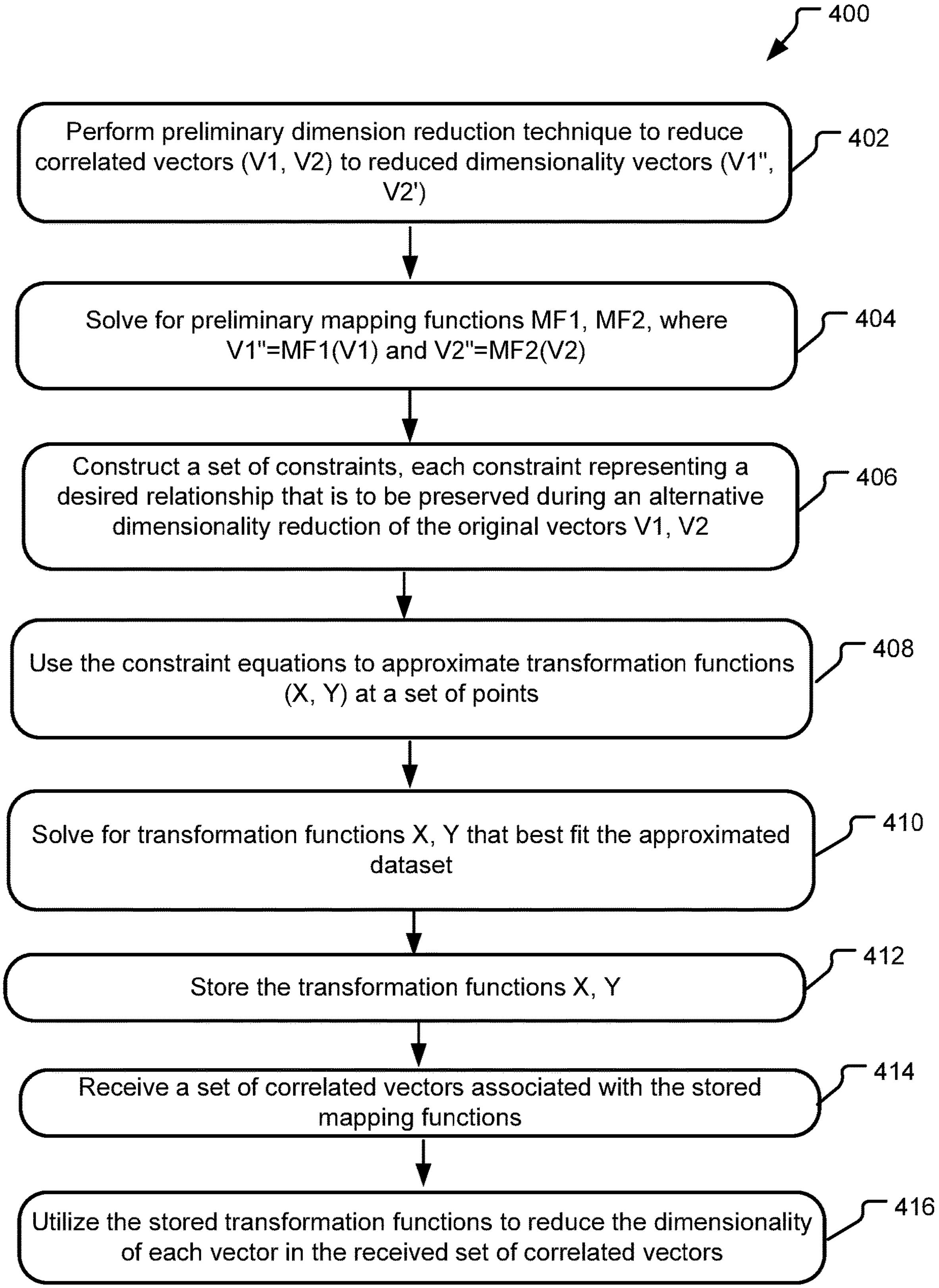
FIG. 4 illustrates example operations for reducing the dimensionality of correlated vectors while preserving the strength of correlation between the vectors.

FIG. 4 illustrates example operations 400 for reducing the dimensionality of correlated vectors while preserving the strength of correlation between the vectors. A preliminary dimension reduction operation 402 executes a known classical or non-classical dimensionality reduction technique on a pair of correlated embeddings V1, V2 corresponding to different object types, where the embeddings are co-trained on a same deep learning model. A first mapping function derivation operations 404 solves for mapping functions MF1, MF2 that are suitable to transform the original correlated embeddings V1, V2 to the corresponding reduced dimensionality embeddings V1", V2" generated by the preliminary dimensionality reduction technique. The functions MF1, MF2 may be subsequently used as initial values in the approximation of mapping functions X, Y, that similarly reduce dimensionality but that also preserve correlation between the original embeddings V1, V2.

A constraint construction operation 406 defines a set of constraints, where each defined constraint represents a desired relationship that is to be preserved during an alternative (non-preliminary) dimensionality reduction of the original vectors V1, V2. According to one implementation, the constraint construction operation 406 defines at least one constraint that ensures a predefined correlation is maintained between the original vectors V1 and V2 after the transformation. One or more constraints may also be defined to preserve magnitude of the individual vectors across the transformation. In some implementations, additional constraints are defined to preserve variance or classification information that would be generated during the preliminary dimension reduction technique. For example, one or more constraints may be defined restricted a distance between V1' (the final reduced embedding) and V1" (the reduced embedding yielded by preliminary dimensionality reduction technique applied in operation 402).

An approximation operation 408 uses the constraint equations to approximate transformation functions X, Y at a set of points. This approximation may be achieved using various known techniques, such as by linearizing the constraint equations by taking partial derivatives of each of the constraint equations with respect to transformation functions X, Y. In such an implementation, the transformation functions MF1 and MF2 associated with the preliminary dimension reduction operation 402 may be used as initial values of X, Y, and the indices of the multi-dimensional embeddings V1, V2 may provide a set of points (e.g., $V1_i$, $V2_i$, where i=0 through i=R−1 and R is the original embedding size) for approximating each of the linearized constraint equations.

A fitting operation 410 solves for functions X and Y that best fit the set of points generated by the approximation operation 408. For example, the fitting operation 410 may utilize a least square optimization technique that minimizes the sum of the squares of the residuals for each data point approximated by the linearized constraint equations.

A storing operation 412 stores the transformation functions X, Y for future use. Subsequently, a receiving operation 414 receives a set of correlated vectors associated with the stored mapping functions. For example, the receiving operation 414 may receive an updated set of the vectors that were initially used to derive the transformation functions X, Y. Alternatively, the received set of correlated vectors may include other vectors created by the same deep learning model but not included in the initial set of vectors used to derive the transformation functions. A computation function 416 uses the stored transformation functions to reduce the dimensionality of each vector in the newly-received vector set.

Figure 5:
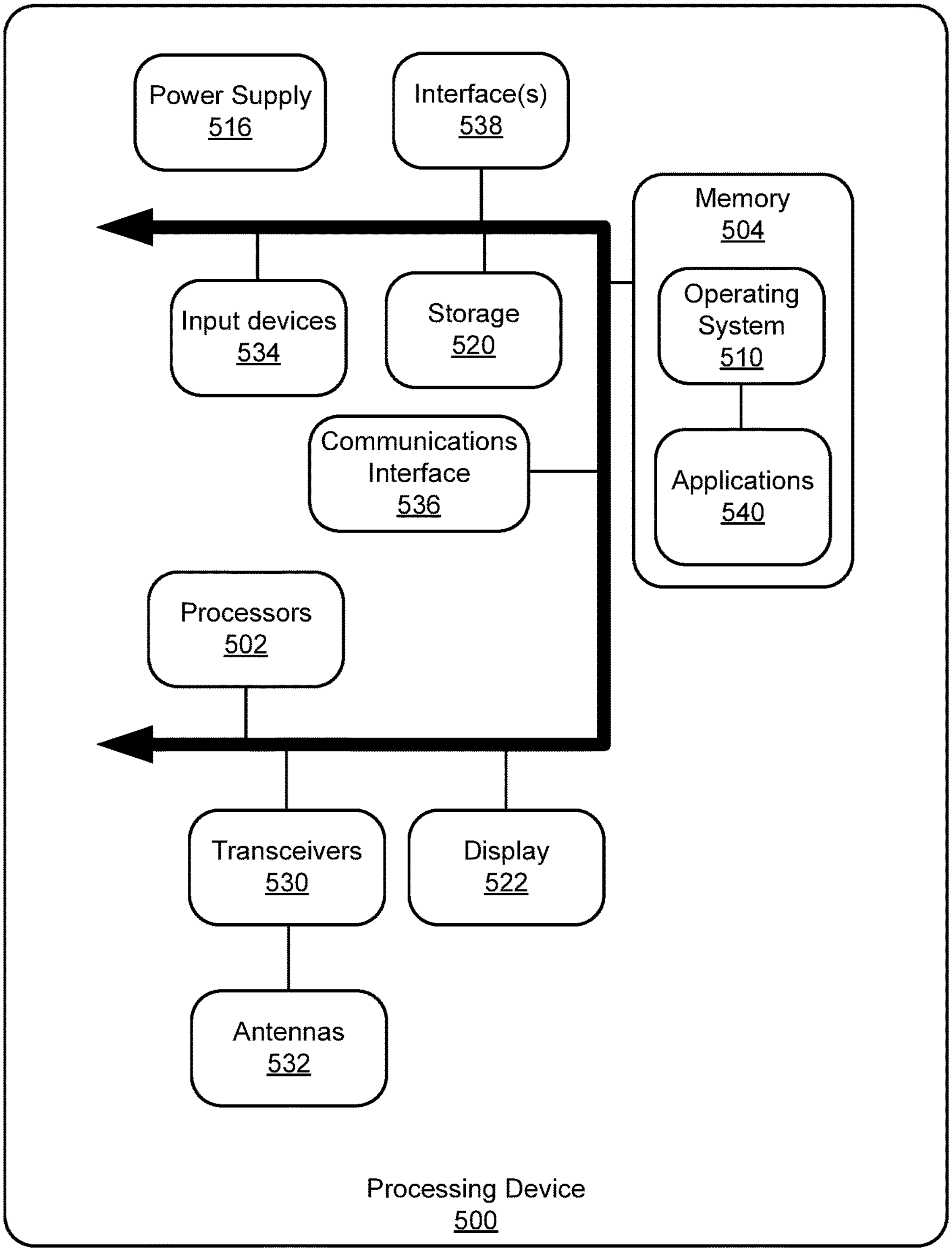
FIG. 5 illustrates an example schematic of a processing device that may be suitable for implementing aspects of the disclosed technology

FIG. 5 illustrates an example schematic of a processing device 500 that may be suitable for implementing aspects of the disclosed technology. The processing device 500 includes processors 502 (e.g., a CPU and a USB controller), memory 504, a display 522, and other interfaces 538 (e.g., buttons). The memory 504 generally includes both volatile memory (e.g., RAM) and non-volatile memory (e.g., flash memory). An operating system 510, such as the Microsoft Windows® operating system, or a specific operating system designed for a gaming device, resides in the memory 504 and is executed by the processor(s) 502, although it should be understood that other operating systems may be employed.

One or more applications 540, such as the embedding generator 106 or 308, mapping function derivation engine 114 or 200, correlation-preserving dimensionality reducer 104 or 324, and similarity predictor 322 are loaded in the memory 504 and executed on the operating system 510 by one or more of the processors 502. Applications 540 may receive input from various input local devices (not shown) such as a microphone, keypad, mouse, stylus, touchpad, joystick, etc. Additionally, the applications 540 may receive input from one or more remote devices, such as remotely-located smart devices, by communicating with such devices over a wired or wireless network using more communication transceivers 530 and an antenna 532 to provide network connectivity (e.g., a mobile phone network, Wi-Fi®, Bluetooth®). The processing device 500 further includes storage 520 and a power supply 516, which is powered by one or more batteries and/or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The following summary provides a non-exhaustive set of illustrative examples of the technology set forth herein.

(A1) According to a first aspect, some implementations include a method (e.g., FIG. 4, 400) that provides for obtaining a first vector and a second vector having a known correlation to one another and defining multiple constraints (FIG. 4, 406) with respect to the first vector and the second vector. At least one of the multiple constraints preserves the known correlation between the first vector and the second vector with respect to transformed versions of the first vector and the second vector. The method further provides for deriving mapping functions (e.g., FIG. 4, 408) for generating the transformed versions of the first vector and the second vector based upon the multiple constraints, where the derived mapping functions reduce the dimensionality of the first vector and the second vector while also preserving the known correlation between the first vector and the second vector. The method still further provides for selecting data to output to a user (e.g., FIG. 3, 326) based on one or more computations that utilize the vectors transformed by the derived transformation functions.

The method of A1 is advantageous because it allows for a reduction in the processing resources needed to compare correlated vectors. For example, instead of taking a dot product of two long vectors (e.g., 100+ dimensions), transformation functions can be retrieved and used to dynamically reduce the two vectors to a small number of dimensions (e.g., 2 dimensions or 4 dimensions). The dot product computation is then dramatically simplified (reducing overhead); yet, the correlation between the vectors is preserved in the dimensionality reduction such that the comparison is as accurate as if it were performed on the full, non-reduced dimensionality vectors.

(A2) In some implementations of A1, obtaining the first vector and the second vector includes obtaining a first embedding and a second embedding from a collection of embeddings co-trained by a same deep learning model.

(A3) In some implementations of A2, the first embedding corresponds to a first object type and the second embedding corresponds to a second object type and the method further comprises using the derived mapping functions to generate multiple reduced dimensionality embeddings of the first object type and multiple reduced dimensionality embeddings of the second object type.

(A4) In some implementations of A2, or A3, the method further includes computing a similarity metric (FIG. 1, 110) for each of multiple different pairs of embeddings transformed by the derived mapping functions, each of the different pairs including an embedding corresponding to the first object type and an embedding corresponding to a second object type; and selecting the data to output to the user based on the computed similarity metrics.

(A5) In some implementations of A2, A3, or A4, the method further includes storing the mapping functions; obtaining updated embeddings generated by the same deep learning model; and using the stored mapping functions to reduce dimensionality of the updated embeddings.

The method of A5 is advantageous because it allows a pre-computed set of transformation functions to be reused to reduce the dimensionality of a set of embeddings even as those embeddings are updated over time without regenerating the set of transformation functions (thereby, reducing computational overhead).

(A6) In some implementations of A1, A2, A3, A4, or A5, deriving the mapping functions (FIG. 2, 216) further comprises deriving multiple mapping functions for a subset of embeddings generated by a same deep learning model (FIG. 1, 102), each of the mapping functions being associated with a different degree of dimensionality reduction.

The method of A6 is advantageous because it may allow a client utilizing the transformation functions to specify a select degree of dimensionality reduction that is desired according to the client's respective computing platform and operations.

(A7) In some implementations of A1, A2, A3, A4, A5, or A6, the method further includes receiving input from a user identifying one or more select mapping functions of the multiple mapping functions; and generating transformed versions of the first vector and the second vector using the one or more select mapping functions.

(A8) In some implementations of A1, A2, A3, A4, A5, A6, or A7, the multiple constraints further include at least one constraint preserving a magnitude of an individual vector before and after being subjected to a dimensionality reduction using one of the derived mapping functions.

The method of A8 is advantageous at least because the use of a secondary constraint facilitates mathematical convergence when solving for the mapping functions.

In another aspect, some implementations include a computing system (e.g., FIG. 2, 200 or FIG. 3, 300) for reducing dimensionality of correlated vectors. The computing system includes hardware logic circuitry that is configured to perform any of the methods described herein (e.g., methods A1-A6).

In yet another aspect, some implementations include a computer-readable storage medium for storing computer-readable instructions. The computer-readable instructions, when executed by one or more hardware processors, perform any of the methods described herein (e.g., methods A1-A6).

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:

obtaining a first embedding corresponding to a first object type and a second embedding corresponding to a second object type, the first embedding and the second embedding having an equal number of dimensions and generated by a same neural network;

performing derivation operations for deriving a first mapping function (X) for transforming the first embedding into a first reduced-dimensionality embedding and a second mapping function (Y) for transforming the second embedding into a second reduced-dimensionality embedding such that a mathematically measurable correlation between the first embedding and the second embedding is preserved between the first reduced-dimensionality embedding and the second reduced-dimensionality embedding, the derivation operations comprising:

defining multiple constraint equations that identify relationships to preserve when transforming the first embedding into the first reduced-dimensionality embedding and the second embedding into the second reduced-dimensionality embedding, at least one of the multiple constraint equations requiring that a similarity metric computed between the first embedding and the second embedding be within a threshold value of the similarity metric computed between the first reduced-dimensionality embedding and second reduced-dimensionality embedding;

representing each of the multiple constraint equations in terms of the first mapping function (X) and the second mapping function (Y);

deriving a dataset by applying a linearization to approximate each of the multiple constraint equations at indices of the first embedding and the second embedding;

applying a least squares optimization to the dataset to solve for the first mapping function (X) and the second mapping function (Y);

generating a first set of reduced-dimensionality embeddings by using the first mapping function (X) to transform a first set of embeddings corresponding to the first object type;

generating a second set of reduced-dimensionality embeddings by using the second mapping function (Y) to transform a second set of embeddings corresponding to the second object type; and within a neural network-based recommendation system, identifying an object of the second object type that satisfies a similarity metric with a given object of the first object type based on computed separations between pairs of embeddings selected from the first set of reduced-dimensionality embeddings and the second set of reduced-dimensionality embeddings; and returning a recommendation that identifies the object of the second object type.

2. The method of claim 1, wherein the first embedding and the second embedding are obtained from a collection of embeddings co-trained by a same deep learning model.

3. The method of claim 1, further comprising:

computing a similarity metric for each of multiple different pairs of embeddings transformed by the first mapping function (X) and the second mapping function (Y), each of the multiple different pairs including an embedding corresponding to the first object type and an embedding corresponding to a second object type; and selecting data to output to a user based on computed values of the similarity metric.

4. The method of claim 2, further comprising:

storing the first mapping function (X) and the second mapping function (Y);

obtaining updated embeddings generated by the same deep learning model;

using the first mapping function (X) and the second mapping function (Y) to reduce dimensionality of the updated embeddings.

5. The method of claim 1, wherein deriving the first mapping function (X) and the second mapping function (Y) further comprises:

deriving multiple pairs of mapping functions for a subset of embeddings generated by a same deep learning model, each of the multiple pairs of mapping functions being associated with a different degree of dimensionality reduction.

6. The method of claim 5, further comprising:

receiving input from a user identifying one or more select mapping functions of the multiple pairs of mapping functions;

generating transformed versions of the first embedding and the second embedding using the one or more select mapping functions.

7. The method of claim 1, wherein the multiple constraint equations further include at least one constraint preserving a magnitude of an individual vector before and after being subjected to a dimensionality reduction using the first mapping function (X) or the second mapping function (Y).

8. The method of claim 1, wherein the method further comprises:

receiving a query identifying a first embedding corresponding to the first object type, the query requesting identification of an object of the second object type corresponding to a second embedding in the second set of embeddings that is determined to have a greatest similarity to the first embedding;

identifying, from the first set of reduced-dimensionality embeddings, a first reduced-dimensionality embedding that corresponds to the first embedding;

computing a similarity metric between the first reduced-dimensionality embedding and multiple embeddings of the second set of reduced-dimensionality embeddings; and based on computed values of the similarity metric, identifying the second embedding; and answering the query with an identification of a select object corresponding to the second embedding.

9. A system comprising:

memory;

one or more processors:

a mapping function derivation engine stored in the memory and executable by the one or more processors to:

obtain a first embedding corresponding to a first object type and a second embedding corresponding to a second object type, the first embedding and the second embedding having an equal number of dimensions and generated by a same deep learning model co-trained on objects of the first object type and the second object type;

perform derivation operations for deriving a first mapping function (X) for transforming the first embedding into a first reduced-dimensionality embedding and a second mapping function (Y) for transforming the second embedding into a second reduced-dimensionality embedding such that a mathematically measurable correlation between the first embedding and the second embedding is preserved between the first reduced-dimensionality embedding and the second reduced-dimensionality embedding, the derivation operations comprising:

defining multiple constraint equations that identify relationships to preserve when transforming the first embedding into the first reduced-dimensionality embedding and the second embedding into the second reduced-dimensionality embedding, at least one of the multiple constraint equations requiring that a similarity metric computed between the first embedding and the second embedding be within a threshold value of the similarity metric computed between the first reduced-dimensionality embedding and second reduced-dimensionality embedding;

representing each of the multiple constraint equations in terms of the first mapping function (X) and the second mapping function (Y);

deriving a dataset by applying a linearization to approximate each of the multiple constraint equations at indices of the first embedding and the second embedding;

applying a least squares optimization to the dataset to solve for the first mapping function (X) and the second mapping function (Y);

a correlation-preserving dimensionality reducer stored in the memory and executable by the one or more processors to utilize the first mapping function (X) and the second mapping function (Y) to:

generate a first set of reduced-dimensionality embeddings by using the first mapping function (X) to transform a first set of embeddings corresponding to the first object type;

generate a second set of reduced-dimensionality embeddings by using the second mapping function (Y) to transform a second set of embeddings corresponding to the second object type; and a neural network-based recommendation system including a similarity predictor stored in the memory and executable by the one or more processors to:

identify an object of the second object type that satisfies a similarity metric with a given object of the first object type by computing separations between pairs of embeddings selected from the first set of reduced-dimensionality embeddings and the second set of reduced-dimensionality embeddings; and return a recommendation identifying the object of the second object type that satisfies the similarity metric with the given object of the first object type.

10. The system of claim 9, wherein the similarity predictor is further configured to:

compute a similarity metric for each of multiple different pairs of embeddings transformed by the first mapping function (X) and the second mapping function (Y), each of the multiple different pairs including one embedding corresponding to the first object type and another embedding corresponding to the second object type; and select data to output to a user based on computed values of the similarity metric.

11. The system of claim 9, wherein the mapping function derivation engine stores the first mapping function (X) and the second mapping function (Y) and is further configured to:

obtain updated embeddings generated by the same deep learning model; and use the first mapping function (X) and the second mapping function (Y) to reduce dimensionality of the updated embeddings.

12. The system of claim 9, wherein the mapping function derivation engine derives multiple sets of mapping functions, each one of the multiple sets of mapping functions including co-derived functions associated with a different degree of dimensionality reduction than other of the multiple sets of mapping functions.

13. The system of claim 12, wherein the correlation-preserving dimensionality reducer is further configured to:

receive input from a user identifying one or more select mapping functions of the multiple sets of mapping functions; and generate transformed versions of two or more embeddings co-trained on the same deep learning model using the one or more select mapping functions.

14. The system of claim 9, wherein the multiple constraint equations further include at least one constraint preserving a magnitude of an individual embedding before and after being subjected to a dimensionality reduction using the first mapping function (X) or the second mapping function (Y).

15. The system of claim 9, wherein the similarity predictor is configured to:

receive a query identifying a first embedding corresponding to the first object type, the query requesting identification of an object of the second object type corresponding to a second embedding in the second set of embeddings that is determined to have a greatest similarity to the first embedding;

identify, from the first set of reduced-dimensionality embeddings, a first reduced-dimensionality embedding that corresponds to the first embedding;

compute a similarity metric between the first reduced-dimensionality embedding and multiple embeddings of the second set of reduced-dimensionality embeddings; and based on computed values of the similarity metric, identify the second embedding; and answer the query with an identification of a select object corresponding to the second embedding.

16. One or more tangible computer-readable storage media encoding computer-executable instructions for executing a computer process, the computer process comprising:

obtaining a first embedding corresponding to a first object type and a second embedding corresponding to a second object type, the first embedding and the second embedding having an equal number of dimensions and generated by a same neural network;

performing derivation operations for deriving a first mapping function (X) for transforming the first embedding into a first reduced-dimensionality embedding and a second mapping function (Y) for transforming the second embedding into a second reduced-dimensionality embedding such that a mathematically measurable correlation between the first embedding and the second embedding is preserved between the first reduced-dimensionality embedding and the second reduced-dimensionality embedding, the derivation operations comprising:

defining multiple constraint equations that identify relationship to be preserved when using the first mapping function (X) to transform the first embedding to the first reduced-dimensionality embedding and the second mapping function (Y) to transform the second embedding into the second reduced-dimensionality embedding, at least one of the multiple constraint equations requiring that a similarity metric computed between the first embedding and the second embedding be within a threshold value of the similarity metric computed between the first reduced-dimensionality embedding and second reduced-dimensionality embedding;

representing each of the multiple constraint equations in terms of the first mapping function (X) and the second mapping function (Y);

deriving a dataset by applying a linearization to approximate each of the multiple constraint equations at indices of the first embedding and the second embedding; and applying a least squares optimization to the dataset to solve for the first mapping function and the second mapping function (Y);

generating a first set of reduced-dimensionality embeddings by using the first mapping function (X) to transform a first set of embeddings corresponding to the first object type;

generating a second set of reduced-dimensionality embeddings by using the second mapping function (Y) to transform a second set of embeddings corresponding to the second object type; and within a neural network-based recommendation system, identifying an object of the second object type that satisfies a similarity metric with a given object of the first object type by computing separations between pairs of embeddings selected from the first set of reduced-dimensionality embeddings and the second set of reduced-dimensionality embeddings, wherein computing the separations between the pairs of embeddings selected from the first set of reduced-dimensionality embeddings and the second set of reduced-dimensionality embeddings reduces computational overhead as compared to computing the separations between pairs of embeddings selected from the first set of embeddings and from the second set of embeddings; and returning a recommendation that identifies the object of the second object type.

17. The one or more tangible computer-readable storage media of claim 16, wherein obtaining the first embedding and the second embedding comprises obtaining the first embedding and the second embedding from a collection of embeddings co-trained by a same deep learning model.

18. The one or more tangible computer-readable storage media of claim 16, wherein the computer process further comprises:

computing a similarity metric for each of multiple different pairs of embeddings transformed by the first mapping function (X) and the second mapping function (Y), each of the multiple different pairs including an embedding corresponding to the first object type and an embedding corresponding to a second object type; and selecting data to output to a user based on computed values of the similarity metric.

19. The one or more tangible computer-readable storage media of claim 16, wherein the computer process further comprises:

receiving a query identifying a first embedding corresponding to the first object type, the query requesting identification of an object of the second object type corresponding to a second embedding in the second set of embeddings that is determined to have a greatest similarity to the first embedding;

identify, from the first set of reduced-dimensionality embeddings, a first reduced-dimensionality embedding that corresponds to the first embedding;

computing a similarity metric between the first reduced-dimensionality embedding and multiple embeddings of the second set of reduced-dimensionality embeddings; and based on computed values of the similarity metric, identifying the second embedding, wherein returning the recommendation comprises answering the query with an identification of a select object corresponding to the second embedding.

20. The one or more tangible computer-readable storage media of claim 16, wherein the mathematically measurable correlation is a dot product or cosine similarity between the first embedding and the second embedding, the dot product or cosine similarity being preserved between the first reduced-dimensionality embedding and the second reduced-dimensionality embedding.

21. The one or more tangible computer-readable storage media of claim 16, wherein the first reduced-dimensionality embedding and the second reduced-dimensionality embedding have an equal number of dimensions.

* * * * *